(12) United States Patent
Pluta et al.

(10) Patent No.: US 10,150,393 B2
(45) Date of Patent: Dec. 11, 2018

(54) FITTING WITH A PIVOTING-FORWARDS MECHANISM AND EASY-ENTRY LATCH, AND VEHICLE SEAT WITH SUCH A FITTING

(71) Applicant: Johnson Controls Technology Company, Plymouth, MI (US)

(72) Inventors: Wolfgang Pluta, Heiligenmoschel (DE); Christian Wolf, Katzenbach (DE); Thomas Dill, Heiligenmoschel (DE); Heinrich Hammann, Teschelmoschel (DE)

(73) Assignee: ADIENT LUXEMBOURG HOLDING S.A.R.L., Luxembourg (LU)

( * ) Notice: Subject to any disclaimer, the term of this patent is extended or adjusted under 35 U.S.C. 154(b) by 154 days.

(21) Appl. No.: 14/910,559

(22) PCT Filed: Jul. 30, 2014

(86) PCT No.: PCT/EP2014/066432
§ 371 (c)(1),
(2) Date: Feb. 5, 2016

(87) PCT Pub. No.: WO2015/028244
PCT Pub. Date: Mar. 5, 2015

(65) Prior Publication Data
US 2016/0176323 A1 Jun. 23, 2016

(30) Foreign Application Priority Data

Aug. 27, 2013 (DE) .................. 10 2013 217 078
Oct. 29, 2013 (DE) .................. 10 2013 221 925

(51) Int. Cl.
*B60N 2/44* (2006.01)
*B60N 2/20* (2006.01)
(Continued)

(52) U.S. Cl.
CPC ............... *B60N 2/444* (2013.01); *B60N 2/12* (2013.01); *B60N 2/20* (2013.01); *B60N 2/206* (2013.01);
(Continued)

(58) Field of Classification Search
None
See application file for complete search history.

(56) References Cited

U.S. PATENT DOCUMENTS

2006/0119158 A1  6/2006  Haverkamp

FOREIGN PATENT DOCUMENTS

CN     101314330 A   12/2008
DE     10319642 A1   12/2004
(Continued)

*Primary Examiner* — David E Allred
(74) *Attorney, Agent, or Firm* — McGlew and Tuttle, P.C.

(57) ABSTRACT

A fitting (2) with a pivoting-forwards mechanism, positioning a backrest (1.1) of a vehicle seat (1) into a forward position, a comfort lock, positioning the backrest into a comfort region seat position (A to C), and an expanded comfort function, positioning the backrest beyond the front position into a loading platform position (E). The fitting includes a fitting part (2.1, 2.2) and a driver (4). A pivoting range of the backrest is limited in the forward position by an easy-entry latch (5) engaging in the fitting part (2.1). The easy-entry latch, when the backrest is adjusted between the seat positions in the comfort region, bears against a stop (7) mounted on the backrest and, in the forward position, is prevented by the stop from pivoting further forwards, and, when the backrest is set upright from the forward position into one of the seat positions, pivots controlled by the stop.

20 Claims, 5 Drawing Sheets

(51) Int. Cl.
*B60N 2/36* (2006.01)
*B60N 2/12* (2006.01)
*B60N 2/90* (2018.01)

(52) U.S. Cl.
CPC .............. *B60N 2/36* (2013.01); *B60N 2/938* (2018.02); *B60N 2002/952* (2018.02)

(56) References Cited

FOREIGN PATENT DOCUMENTS

| | | | |
|---|---|---|---|
| DE | 10 2004 008 599 B3 | 6/2005 | |
| DE | 10 2004 056 507 B3 | 11/2005 | |
| DE | 102004042038 A1 * | 3/2006 | ........... B60N 2/0818 |
| DE | 102011012562 A1 * | 8/2012 | ............... B60N 2/20 |
| JP | 2010 252885 A | 11/2010 | |
| WO | 2008091638 A1 | 7/2008 | |

* cited by examiner

FITTING WITH A PIVOTING-FORWARDS MECHANISM AND EASY-ENTRY LATCH, AND VEHICLE SEAT WITH SUCH A FITTING

CROSS REFERENCE TO RELATED APPLICATIONS

This application is a United States National Phase Application of International Application PCT/EP2014/066432 filed Jul. 30, 2014 and claims the benefit of priority under 35 U.S.C. § 119 of German Patent Applications 10 2013 217 078.5 filed Aug. 27, 2013 and 10 2013 221 925.3 filed Oct. 29, 2013, the entire contents of which are incorporated herein by reference.

FIELD OF THE INVENTION

The invention relates to a fitting having a forward pivoting mechanism, such as an easy-entry system or loading system, and an easy-entry detent, an easy-entry detent for such a fitting and a vehicle seat having such a fitting with a forward pivoting mechanism, such as an easy-entry function or loading function, and having a comfort locking mechanism (=so-called softlock).

BACKGROUND OF THE INVENTION

In the prior art, there are known various easy-entry systems which enable facilitated entry into a second seat row of a vehicle. The easy-entry system can be actuated by means of an unlocking lever which is conventionally arranged on a backrest of the vehicle seat, whereby the backrest of the vehicle seat pivots out of an entry region. If the vehicle seat is arranged on rails, when the unlocking lever is actuated, the vehicle seat may additionally or alternatively be displaceable in the travel direction out of the entry region.

DE 10 2004 056 507 B3 discloses a vehicle seat. The vehicle seat comprises a seat frame, a backrest frame which is articulated in a foldable manner and which can be locked by means of catch adjustment members and which is displaceable between an upright basic position, a partially folded-forward easy-entry position and a completely folded-forward cargo position, and an unlocking shaft which is pivotable by means of an unlocking lever for releasing the catch adjustment members. The backrest frame is adjustable from the basic position into the cargo position only by being folded forward into the easy-entry position, subsequently locked by returning the unlocking lever, subsequently unlocked by actuating the unlocking lever and subsequently folded forward into the cargo position. To this end, there is provided an easy-entry mechanism which inter alia has: a control cam which is provided on the backrest frame with an easy-entry stop, a locking hook which is articulated to the seat frame for engaging in the easy-entry stop and a tappet which is articulated to the unlocking shaft in an eccentric manner and which, during folding forward, is initially in an inactive position and releases the locking hook in an active position.

SUMMARY OF THE INVENTION

An object of the present invention is to provide a fitting for a vehicle seat having a forward pivoting mechanism, such as an easy-entry system, and having an improved locking system. Furthermore, an object of the invention is to provide a vehicle seat having such an improved fitting and an easy-entry detent (easy-entry latch) for such a fitting.

According to the invention, there is provided a fitting having a forward pivoting mechanism, in particular an easy-entry system and/or loading system for positioning a backrest of a vehicle seat in a front position, in particular in an easy-entry position and/or loading position, a comfort locking system for positioning the seat backrest in at least one comfort or seat position and an expanded comfort function for positioning the seat backrest beyond the front position, in particular the easy-entry position and/or loading position, into a loading floor position. The fitting according to the invention comprises at least one fitting portion and a carrier which is in particular in engagement with a comfort lever, wherein a pivot region of the seat backrest in the front position, in particular in the easy-entry position and/or loading position, is limited by means of an easy-entry detent which engages in the at least one fitting portion, wherein the easy-entry detent, in particular the dimensions and/or inner and/or outer contours thereof, is/are constructed in such a manner that, when the seat backrest is adjusted in the comfort region between the seat positions, it is in abutment with a stop which is secured to the backrest and, in the front position, in particular in the easy-entry position and/or loading position, is prevented from pivoting further forward by means of the stop and, when the seat backrest is raised, is pivoted in a controlled manner from the front position, in particular from the easy-entry position and/or loading position, into one of the seat positions by means of the stop.

That is to say: the fitting has a forward pivoting mechanism which is configured to operate at least one function, in particular an auxiliary entry means (easy-entry system) or an auxiliary loading means. Depending on the function, the fitting comprises as an auxiliary entry means the easy-entry detent or, as an auxiliary loading means, a locking lever. The two functions differ only in terms of the inclination angle when the seat backrest is pivoted forward. The easy-entry detent or the locking lever is constructed so as to correspond to the functions which are integrated in each case. That is to say: the easy-entry detent is constructed in terms of its dimensions, contours, in particular inner, outer and/or stop contours, in such a manner that a plurality of functions, such as a locking function and a softlock function, are integrated therein. For example, the easy-entry detent has to this end inner and/or outer locking, stop and/or control contours. The locking lever is constructed in terms of its dimensions, contours, in particular inner, outer and/or stop contours, in such a manner that a plurality of functions, such as a locking function and a softlock function, are integrated therein. For example, the locking lever has to this end inner and/or outer locking, stop and/or control contours.

In this instance, the locking, stop and/or control contours of the easy-entry detent and the locking lever for positions to be identically adjusted of the seat backrest may be constructed to be at least partially and/or completely identical and may be constructed to be at least partially and/or completely different only for positions of the seat backrest which are intended to be adjusted differently. The invention is described below with reference to the easy-entry detent, wherein the invention can be constructed in a similar manner to this for the locking lever.

Furthermore, the carrier can be coupled to an unlocking lever for unlocking the fitting and can be decoupled from the unlocking lever for positioning the seat backrest from the front position, for instance out of the easy-entry position, into the loading floor position, wherein, in the decoupled state of the carrier and the unlocking lever, the carrier carries the easy-entry detent when the unlocking lever is actuated.

Such a variable coupling of the unlocking lever and carrier enables a comfortable expansion of the functions of the vehicle seat for positioning the backrest beyond the at least one front position, such as the easy-entry position, directly into a loading floor position. User-friendliness of the vehicle seat is thereby improved. Furthermore, it is ensured that the unlocking lever is not moved when the upper easy-entry actuation lever is pulled. With a forced coupling, when the easy-entry actuation lever is pulled at the upper edge of the seat backrest, the easy-entry or locking detent (also referred to as the locking lever) would be pulled so that anyone who does not release the easy-entry actuation lever promptly would then pivot the seat backrest into the loading floor position. In practice, this could be undesirable for the user.

In a possible development of the invention, the easy-entry detent can be locked in a pretensioned manner in the at least one comfort or seat position. On the one hand, the backrest is thereby retained and fixed in a predetermined position for use or comfort position and, on the other hand, when unlocked, is moved from the predetermined position for use or comfort position into the front position, such as the easy-entry position.

In one embodiment, the easy-entry detent can be pretensioned in the at least one seat position by means of a resilient element which is constructed in particular as a helical spring or a leg spring. The resilient element is in this instance subjected to bending loads about the axis thereof and can in this instance be constructed as a bending spring which is wound in a flat manner and whose one outer end is secured to a member of the easy-entry detent and whose other inner end is secured to the lower floor, in particular to the lower fitting portion. In order to position the seat backrest from the front position, such as the easy-entry position, into one of the comfort positions, the resilient element produces in the manner of a restoring spring, after actuation of the comfort lever, a restoring force for the easy-entry detent so that it is moved back after the pretensioning has been released by releasing the locking of the seat backrest in the comfort or seat position into the front position again, such as the easy-entry position.

Another embodiment makes provision for the easy-entry detent to have at least one stop contour which corresponds to a stop which is in particular secured to the seat backrest, on one of the fitting portions, in particular to the upper fitting portion, for example, a curved outer or inner contour. In particular, the easy-entry detent is in abutment in the at least one comfort or seat position with the stop contour thereof, in particular a raised or curved outer contour, on the stop of the upper fitting portion, which stop is secured to the backrest, so that the easy-entry detent is pressed downward in the comfort position and the seat backrest can be locked in the comfort position. When the backrest is adjusted in the comfort range, only unlocking forces of the fitting thereby have to be overcome so that the operating comfort is improved. Depending on the embodiment of the fitting, the relevant stop contour, for example, the outer contour of the easy-entry detent and the outer contour of the backrest-side stop, are formed in such a manner, in particular they have such dimensions and contours which correspond to each other, that the seat backrest can be locked in all possible comfort positions.

Furthermore, the easy-entry detent has at least one recess in an inner or outer contour. By means of the recess in the inner or outer contour of the easy-entry detent, a forward pivoting of the seat backrest extending beyond the front position, such as the easy-entry position, in particular in the loading floor or table position, is prevented. To this end, the easy-entry detent may further have at least one locking detent in the inner or outer contour, in particular in the region of the recess, whereby further pivoting of the seat backrest beyond the front position, such as the easy-entry position, is reliably prevented.

Alternatively or additionally, the easy-entry detent may have at least one stop, in particular a front and a rear stop for integration of the locking function in the front position, such as the easy-entry position, or for integration of the softlock function.

The stops may in this instance be offset vertically or laterally with respect to each other and consequently have different heights or be laterally spaced apart from each other. This enables in a simple manner the integration of a softlock unlocking function which is tolerance-, user- and operation-dependent in the easy-entry detent for actuating the easy-entry movement. In this instance, the softlock unlocking function can be unlocked in a forward direction and can consequently be "switched away" by means of the locking or easy-entry detent with the front stop.

In particular the front stop in this instance may be arranged independently on a second detent or on another component of the fitting. The rear stop is preferably integrated in the easy-entry detent so that prompt re-raising of the seat backrest and consequently pivoting back into the comfort or seat position by means of a corresponding control contour (also referred to as a softlock contour) of the stop of the easy-entry detent is made more difficult when the seat backrest is in the front position, the easy-entry position.

In place of the vertical offset of the stops, they may also be laterally offset so that the front stop also engages when the easy-entry detent already releases the path toward the rear in order to raise the seat backrest again.

Another embodiment makes provision for the easy-entry detent to have at least one control contour, for example, on a rear stop, or in an outer contour or inner contour. By means of the control contour, a backward pivoting of the seat backrest from the front position, such as the easy-entry position, into one of the comfort or seat positions is made more difficult. In this instance, the control contour is constructed in such a manner, in particular inclined, that it brings about a small resistance when the backrest is raised from the front position, such as the easy-entry position, into one of the comfort position or the position for use in the manner of a softlock function and consequently it is necessary to overcome a resultant friction force.

In another embodiment, the unlocking lever has at least one in particular outer comfort control contour which, when the unlocking lever is actuated, is positioned against the easy-entry detent and carries it. That is to say: when the unlocking lever is actuated, for example, by means of a translatory pulling movement by means of a pulling element, such as a Bowden cable, the easy-entry detent is switched away by the comfort control contour engaging in a corresponding inner or outer guiding or control contour of the easy-entry detent so that the easy-entry detent is also carried.

Furthermore, the carrier and the unlocking lever are rotatably supported on a common rotation axis on the at least one fitting portion. This leads to smaller production costs. Alternatively, the carrier and the unlocking lever may also be supported on separate rotation axes.

An easy-entry detent or a locking lever for use on the fitting with a forward pivoting mechanism for positioning a seat backrest of a vehicle seat in at least one front position, a comfort locking system for positioning the seat backrest in at least one seat position and an expanded comfort function for positioning the seat backrest beyond the front position in a loading floor position is further provided in accordance with the invention, wherein the easy-entry detent or the locking lever has at least one inner and/or outer guiding and/or control contour and these guiding and/or control contours are configured to carry out or support the forward pivoting mechanism, the comfort locking system and/or the expanded comfort function.

The fitting according to the invention is used in particular in a vehicle seat having an adjustable seat backrest.

In this instance, the fitting of the vehicle seat comprises an upper fitting portion which is arranged on the backrest or seat backrest and a lower fitting portion which is secured to a substructure, wherein the fitting portions can be moved relative to each other so that a rotational movement is possible in relative terms between the upper fitting portion and the lower fitting portion.

Preferably, such a fitting is arranged at a side of the vehicle seat in each case, wherein the fittings are coupled to each other by means of a transmission element. Consequently, a securing of the seat backrest at both sides can be cancelled in order to be able to pivot the backrest.

The transmission element is in particular a rod or a pipe, wherein the transmission element can be rotated about the longitudinal axis thereof, as known, for example, from DE 10 2004 008 599 B3. The coupling of the fittings is preferably carried out from a positive-locking connection between a respective end of the transmission element and the respective fitting. In addition, there may be provided an axial securing which is, for example, a so-called rapid fixing member and which, during the assembly and transport of the catch fitting, prevents a displacement of the fitting portions in an axial direction, wherein a rotation of the upper fitting portions relative to the lower fitting portions is possible.

A vehicle seat has a fitting having an integrated easy-entry system, an integrated comfort locking system and an expanded comfort function for positioning the seat backrest beyond an easy-entry position in a loading floor position, wherein an unlocking lever and a carrier can be decoupled from each other.

In particular, the fitting of the vehicle seat comprises an upper fitting portion, which is arranged on the backrest, and a lower fitting portion which is fixed to a substructure, wherein such a fitting can be arranged at a side of the vehicle seat, respectively. In this instance, the carrier or the carrier profile is rotatably arranged in the region of the upper fitting portion.

Embodiments of the invention are explained in greater detail below with reference to drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
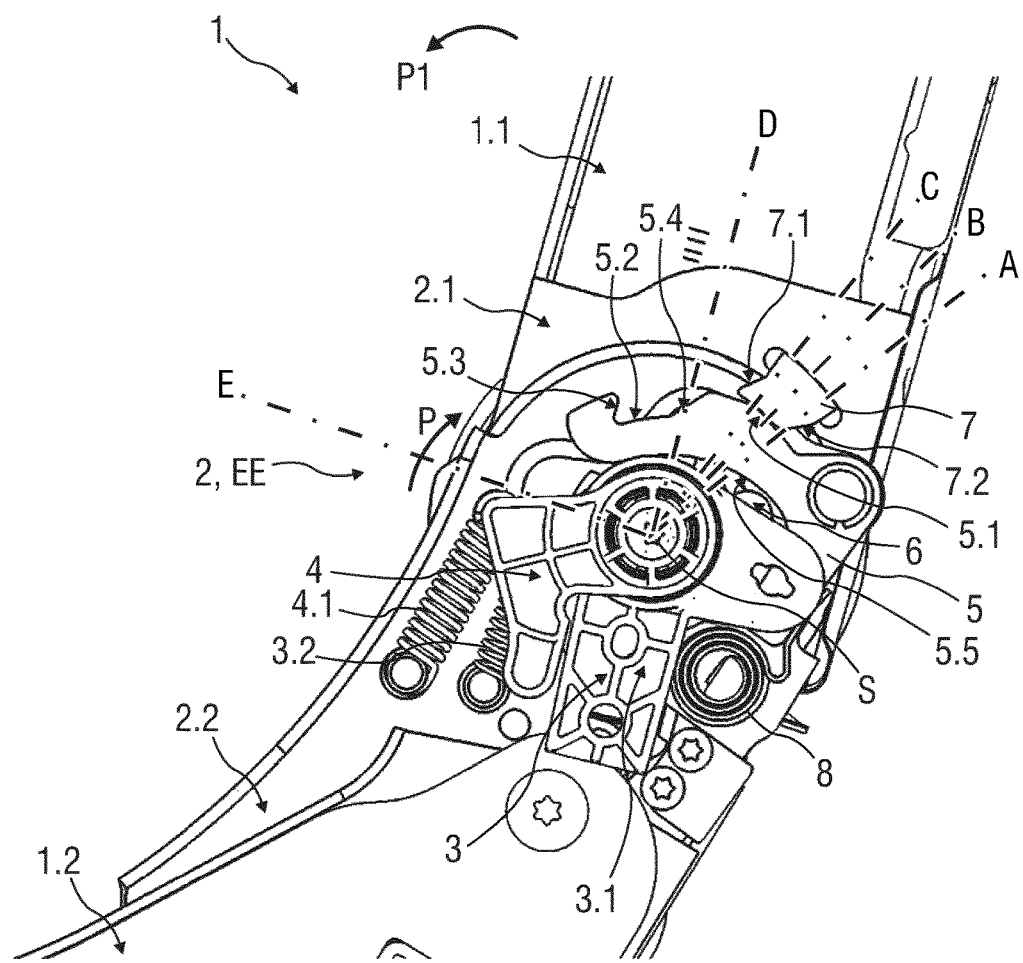
FIG. 1 is a schematic plan view of a portion of a vehicle seat with a backrest and a seat cushion and with a fitting having a forward pivoting mechanism, such as an easy-entry system, and comfort locking system and expanded comfort function.

Components which correspond to each other are given the same reference numerals in all the figures.

FIG. 1 is a schematic plan view of a portion of a vehicle seat 1 with a seat backrest 1.1 and a seat cushion 1.2 in the region of a fitting 2, wherein the seat backrest 1.1 is rotatably arranged on the seat cushion 1.2 by means of the fitting 2.

The fitting 2 has a forward pivoting mechanism which is configured to operate at least one function, in particular an auxiliary entry means (easy-entry system) or auxiliary loading means. Depending on the function, the fitting 2 comprises as an auxiliary entry means an easy-entry detent 5, 5' or as an auxiliary loading means a locking lever. The two functions differ only in terms of the inclination angle when the backrest 1.1 is pivoted forward. The easy-entry detent 5, 5' or the locking lever is constructed with inner or outer guiding, locking and/or control contours so as to correspond to the respectively integrated functions.

The invention is described below for a forward pivoting mechanism which is constructed as an easy-entry system EE with an easy-entry position D as a front position. The invention can be used in a similar manner on a forward pivoting mechanism which is constructed as a loading system and which is not illustrated in greater detail, wherein in place of the easy-entry detent 5, 5' a correspondingly constructed and configured locking lever is provided.

The vehicle seat 1 is, for example, a front seat or a vehicle seat of a rear, for example, a second, seat row for a vehicle and is arranged on a rail system, whereby the vehicle seat 1 can be displaced in the longitudinal direction of the vehicle.

In order to simplify entry into a rear region or a rear seat row of the vehicle, the vehicle seat 1 has an easy-entry function which can be implemented by means of an easy-entry system EE of the fitting 2.

The easy-entry function is an auxiliary entry means which enables increased and consequently more comfortable access to the rear region, in particular of a two-door vehicle or to a rear seat row of a multi-door vehicle. Using the easy-entry system EE, the vehicle seat 1 is displaced on the rail system in the travel direction in order to increase the entry region, wherein at the same time the seat backrest 1.1 of the vehicle seat 1 is folded forward into an easy-entry position D. In this instance, a pivot range of the seat backrest 1.1 is limited in a forward direction, for example, up to 35°, when the easy-entry function is activated.

Furthermore, the seat backrest 1.1 can be pivoted into an additional comfort position, in particular into a loading floor position E, by means of an expanded comfort function.

The seat backrest 1.1 can be pivoted about a pivot axis S which extends in the direction of the transverse extent of the vehicle. The pivoting of the seat backrest 1.1 can be actuated by activating an activation lever which is not illustrated in greater detail and which is articulated to an unlocking lever 3 of the easy-entry system EE which is resiliently loaded with a restoring spring 3.2 at an articulation location 3.1 by means of a Bowden cable 9 shown in FIG. 2 or another suitable pulling element. The actuation lever is provided at only one side of the vehicle seat 1.

At each side of the vehicle seat 1 there is arranged a fitting 2 which is formed from an upper fitting portion 2.1 and a lower fitting portion 2.2. The upper fitting portion 2.1 is fixed to the seat backrest 1.1 so as to be secured to the backrest and the lower fitting portion 2.2 is arranged so as to be secured to the substructure, for example, fixed to the vehicle floor. The fitting 2 is constructed in such a manner that a rotation movement is carried out in a relative manner between the upper fitting portion 2.1 and the lower fitting portion 2.2.

The fittings 2 which are arranged at each side of the seat backrest 1.1 are coupled to each other by means of a transmission element which is not shown in greater detail in the form of an angled transmission rod or a pipe so that a securing of the seat backrest 1.1 can be cancelled at both sides in order to be able to pivot the backrest. In this instance, a fitting 2 is secured to one end of the transmission element in a positive-locking manner.

The transmission element is in particular a rod or a pipe, which connects the fitting component to another fitting component which may be provided, wherein the transmission element can be rotated about the longitudinal axis thereof, as known from DE 10 2004 008 599 B3.

The easy-entry system EE and the expanded comfort function for the loading floor position E are integrated in the fitting 2 and illustrated in greater detail in FIG. 1.

The easy-entry system EE comprises the carrier 4 which is rotatably arranged on the fitting 2 and which is resiliently loaded with an associated restoring spring 4.1 and the unlocking lever 3 which can be decoupled therefrom and which is also rotatably arranged on the fitting 2. In the embodiment shown, the carrier 4 and the unlocking lever 3 can be rotated about a common rotation and pivot axis S.

By actuating an easy-entry actuation lever which is not shown in greater detail, the carrier 4 and with it the unlocking lever 3 is pivoted about the pivot axis S along an arrow P in the clockwise direction in order to unlock the fitting 2 and to initiate an adjustment function and/or the easy-entry function, whereby the fitting 2 is unlocked and the seat backrest 1.1 can be pivoted forward, in particular forward through approximately 35°, in a counter-clockwise direction in the direction P1 from a seat position A via seat positions B and C (also called comfort, use or backrest positions) into the easy-entry position D and the vehicle seat 1 can optionally be displaced.

Depending on the embodiment of the easy-entry function, it is possible at the same time to open a longitudinal adjustment rail system, whereby the vehicle seat 1 can be moved forward in order, in addition to the seat backrest 1.1 which is inclined forward, to enable a maximum entry region.

The seat positions A to C of the seat backrest 1.1 represent a comfort seating region of the seat backrest 1.1, which can be adjusted by means of a seat function which is integrated in the fitting 2. The easy-entry position D of the seat backrest represents the easy-entry position D.

In the comfort seating region of the seat backrest 1.1 with the seat positions A to C, wherein the seat position A represents the rearmost comfort seat position, the seat position B represents the initial or design seat position and seat position C represents the foremost comfort seat position, the easy-entry detent 5 is in abutment with a stop contour which is constructed as an outer contour 5.1 against a stop 7 of the upper fitting portion 2.1. The stop 7 which is secured to the backrest is formed as a stop face which protrudes from the surface of the upper fitting portion 2.1, in particular as a stop tongue or flap. Alternatively, the stop 7 may be constructed separately as a profile element, in particular as an L-shaped profile, and may be secured to the upper fitting portion 2.1, in particular welded.

The fitting 2 further comprises a resilient element 8 which is constructed, for example, as a pretensioning spring for a comfort locking system and which pretensions the easy-entry detent 5 in the comfort seat region and consequently in all seat positions A to C in the clockwise direction. Brought about by the abutment of the stop contour of the easy-entry detent 5 on the stop 7, the easy-entry detent 5 is pressed downward so that in the comfort seat position only the fitting unlocking forces have to be overcome. The fitting 2 may in this instance in all seat positions A to C lock the comfort seat region. The fitting 2 cannot be locked between the seat position C and the easy-entry position D.

As an alternative to the stop contour of the easy-entry detent 5 in the form of an outer contour 5.1, it may also be constructed as an inner contour with which the stop 7 is in abutment.

By means of the easy-entry function of the fitting 2 and when the fitting 2 is unlocked (not locked), the seat backrest 1.1 can be pivoted further forward counter to the direction of the arrow P into the easy-entry position D. In this instance, the outer contour 5.1 of the easy-entry detent 5 slides along the stop 7 until the stop 7 slides into an edge-side recess 5.2 of the easy-entry detent 5. Alternatively to the edge-side or rim-side outer recess 5.2, the recess may be integrated as an inner contour with an inner recess in the easy-entry detent 5.

Alternatively, in a manner not illustrated in greater detail, stops may be integrated in the easy-entry detent 5 and provide a softlock function or a locking function when the backrest 1.1 is adjusted in the different positions.

The recess 5.2 has, in the direction P1 forward in the direction of the easy-entry position D and consequently counter to the arrow P as a counter-stop for the stop 7, a locking detent 5.3 which prevents further forward pivoting into a loading floor position E. Alternatively to the locking detent 5.3, a front stop, in particular a locking stop, may be formed in an inner or outer contour of the easy-entry detent 5.

The stop 7 which is secured to the backrest is in a possible embodiment correspondingly provided with a corresponding locking contour 7.1, for example, in the form of a barbed hook or a similar form.

In the opposing pivot direction and consequently in the direction of the arrow P toward the rear in the direction of the comfort seating region and consequently back into the seat positions C to A, the recess 5.2 of the easy-entry detent 5 has a (comfort locking) control contour 5.4 (also called softlock contour), which controls backward pivoting, in particular makes it more difficult as a result of the rising shape of the (comfort locking) control contour 5.4 and which has to be overcome during pivoting backward. In a corresponding manner, the stop 7 also has an associated comfort locking control contour 7.2 (also called softlock contour).

Alternatively, in a manner which is not illustrated in greater detail, at least one rear stop may be integrated in an inner or outer contour of the easy-entry detent 5, wherein the seat backrest 1.1 is raised again from the easy-entry position D into one of the seat positions C to A with greater difficulty.

In order to further pivot the seat backrest 1.1 into the loading floor position E and consequently to release the stop 7 from the recess 5.2 of the easy-entry detent 5, a decoupling of the unlocking lever 3 and carrier 4 is required. By means of this decoupling, control of the seat backrest 1.1 in a manner independent of the easy-entry position D and consequently an expanded comfort position of the seat backrest 1.1 in the loading floor position E or another position, for example, a table position, is possible.

To this end, the unlocking lever 3 comprises a comfort control contour 6, for example, in the form of a control cam which is in operational connection with a comfort control contour 5.5 of the easy-entry detent 5 in such a manner that, when the unlocking lever 3 is rotated, the easy-entry detent 5 is carried downward in the direction of the lower fitting portion 2.2, whereby the locking of the easy-entry detent 5 to the upper fitting portion 2.1, in particular to the stop 7, is released.

The comfort control contour 5.5 of the easy-entry detent 5 and the comfort control contour 6 of the unlocking lever 3 are constructed so as to correspond to each other and may be constructed as an inner or outer contour, or vice versa.

That is to say: if the unlocking lever 3 is actuated in the state decoupled from the carrier 4, the unlocking lever 3 carries the easy-entry detent 5 via the comfort control contour 6 thereof and unlocks it so that further pivoting in the direction of the expanded comfort position, for example, the loading floor position E, is enabled.

In the embodiment, the movement of the unlocking lever 3 is brought about by means of pulling on a loop which is not illustrated in greater detail and which brings about a rotation movement of the unlocking lever 3 itself. This is brought about by the type of fitting 2 since it is unlocked by means of a rotation of the carrier 4. There are also embodiments in which, by means of a so-called remote actuation ("remote system"), the carrier is controlled with the lever supported elsewhere. The carrier 4 is moved by the user into the position required to open the fitting 2, in the embodiment illustrated therefore a rotation about the backrest rotation location.

It is advantageous that, in the expanded comfort position, the loading floor position E, it is only necessary to work against the resilient element 8, the so-called softlock or comfort locking spring, wherein, in the comfort seating region, only the fitting unlocking forces have to be overcome.

The comfort locking of the fitting 2, the so-called softlock, has the function that, when moving back into one of the (comfort) seat positions A to C or travel positions from the easy-entry position D, the rail first has to be moved back and then, by overcoming the softlock force which corresponds to the force for overcoming the comfort locking control contour 5.4 of the easy-entry detent 5, the backrest 1.1 is raised.

Figure 2:
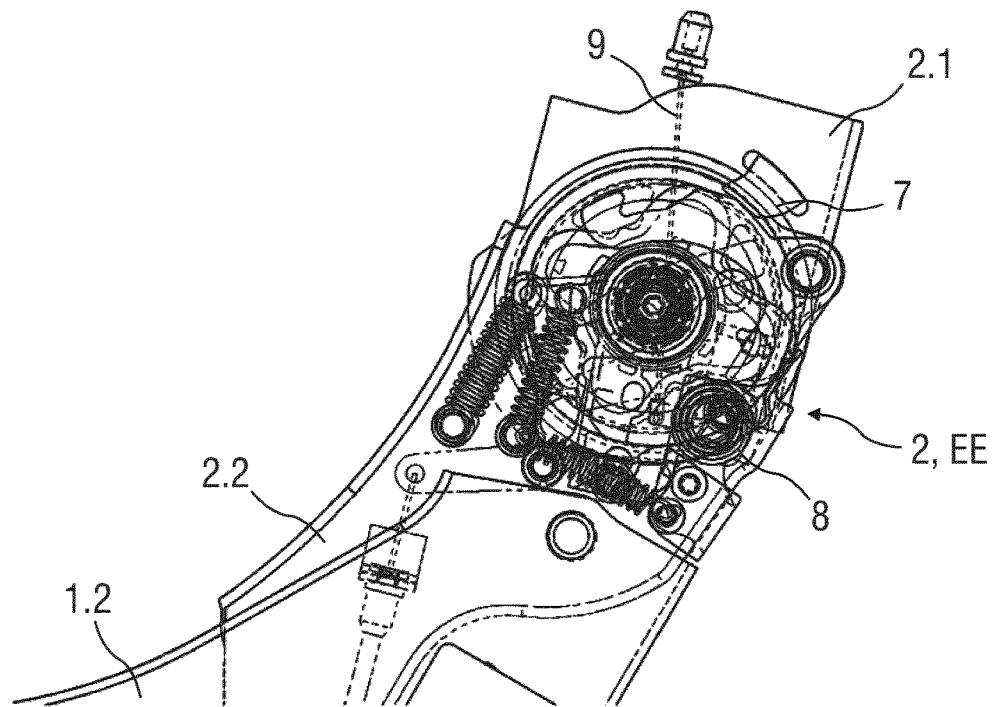
FIG. 2 is a schematic plan view of FIG. 1, illustrating in a transparent manner the components of the fitting and the easy-entry system.

FIG. 2 is a schematic plan view of the fitting 2 according to FIG. 1, illustrating in a transparent manner the components of the fitting 2 and the easy-entry system EE.

In order to initiate the easy-entry function, the carrier 4 can be coupled by means of a Bowden cable 9 and/or another suitable transmission element to an easy-entry actuation lever (not illustrated in greater detail).

FIGS. 3 to 7 are schematic plan views of different components of the fitting 2 for the comfort locking with associated control contour faces.

Figure 3:
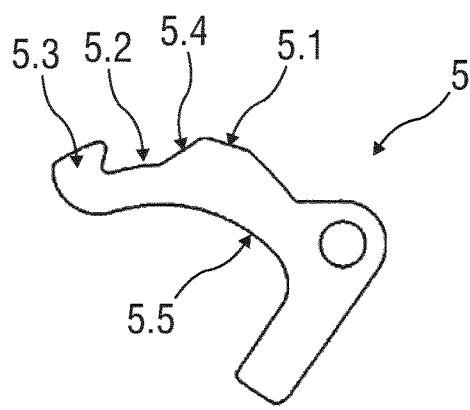
FIG. 3 is a schematic plan view of one of different components of the fitting.
Figure 4:
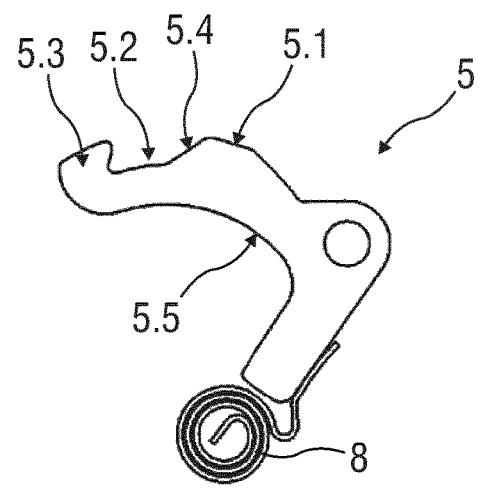
FIG. 4 is a schematic plan view of another of different components of the fitting.

FIGS. 3 and 4 show the easy-entry detent 5 without and with the resilient element 8 for the pretensioning thereof in the comfort seating region. The easy-entry detent 5 comprises the stop contour which is constructed as an outer contour 5.1 or inner contour as a counter-stop face for the backrest-side stop 7, the recess 5.2 and the locking detent 5.3 or a front stop for preventing a forward pivoting of the seat backrest 1.1 extending beyond the easy-entry position D, the in particular outer or inner (comfort locking) control contour 5.4 (also called softlock contour) for making backward pivoting of the seat backrest 1.1 more difficult, and the in particular inner or outer comfort control contour 5.5 for a forward pivoting of the seat backrest 1.1 extending beyond the easy-entry position D into the loading floor position E.

Figure 5:
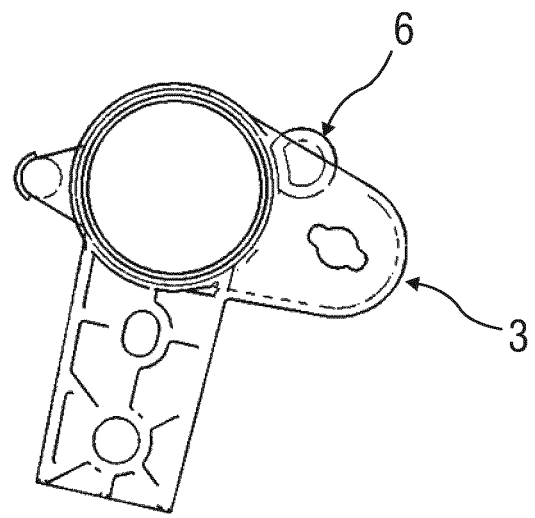
FIG. 5 is a schematic plan view of another of different components of the fitting.

FIG. 5 shows the unlocking lever 3 with the comfort control contour 6 for decoupling of the unlocking lever 3 and carrier 4 and carrying and consequently switching away of the easy-entry detent 5 for controlling the loading floor position E, that is to say, pivoting the seat backrest 1.1 forward beyond the easy-entry position D into the loading floor position E. The comfort control contour 6 is in this instance constructed so as to correspond to the, for example, inner comfort control contour 5.5 of the easy-entry detent 5 so that it is pressed downward and consequently can be pressed out of the locking seat of the stop 7 in the recess 5.2 and switched away, in order to pivot the seat backrest 1.1 forward into the loading floor position E.

Figure 6:
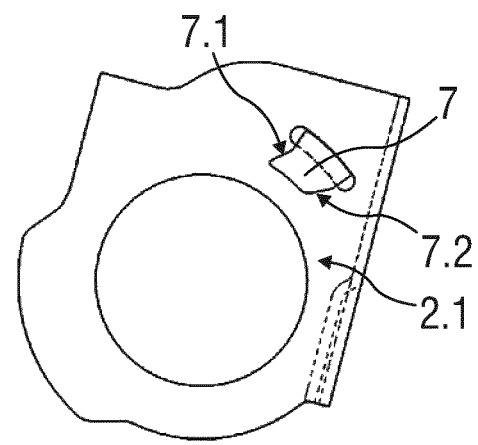
FIG. 6 is a schematic plan view of another of different components of the fitting.

FIG. 6 shows the upper fitting portion 2.1 with the stop 7. The stop 7 is formed as a stop face which protrudes from the surface of the upper fitting portion 2.1, in particular as a stop tongue or flap, which may, for example, be cut out from an aperture and formed or bent. Alternatively, the stop 7 may be constructed separately as a profile element, in particular as an L-shaped profile, and be secured, in particular welded, to the upper fitting portion 2.1.

Figure 7:
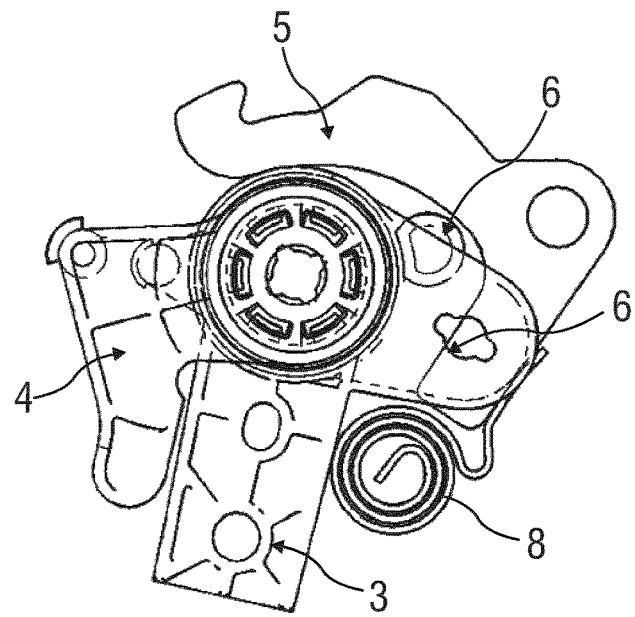
FIG. 7 is a schematic plan view of another of different components of the fitting.

FIG. 7 shows the components of the fitting 2 which enable a comfort function which is expanded in addition to the easy-entry function with a loading floor position E, in the assembled state. In order to achieve the easy-entry function and the expanded comfort function, the fitting 2 comprises as components the carrier 4, the unlocking lever 3 and the easy-entry detent 5.

Figure 8:
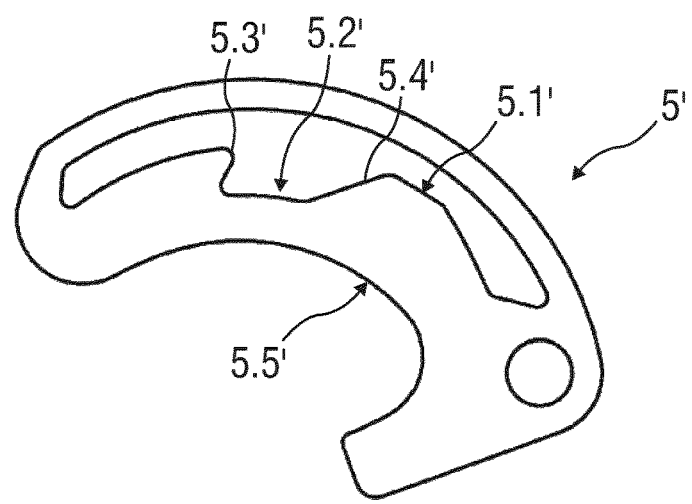
FIG. 8 is a schematic illustration of an embodiment of an alternative easy-entry detent or a locking lever with inner control and stop contours.

FIG. 8 is a schematic illustration of an embodiment of an alternative easy-entry detent 5' with inner control and stop contours 5.1' to 5.5' in a similar manner to the above-described outer control and stop contours 5.1 to 5.5. The stop 7 which is secured to the backrest is adapted accordingly, for example, constructed as a stop pin which is guided in the inner contour.

Figure 9:
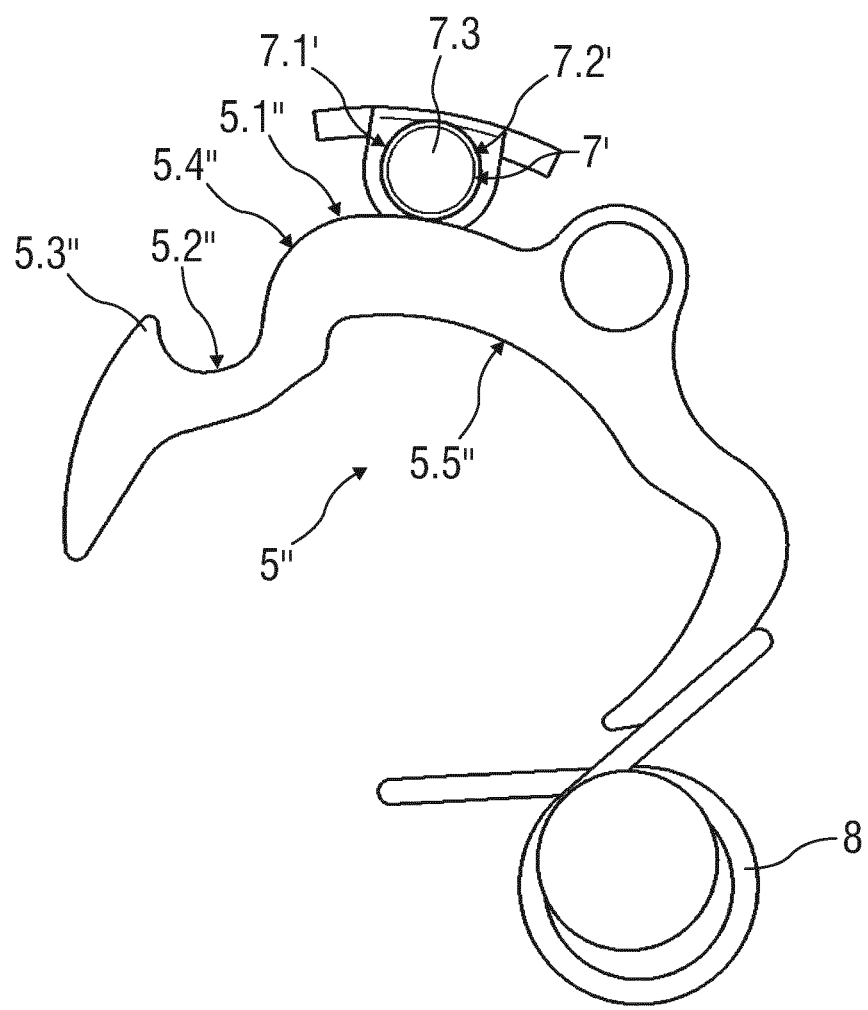
FIG. 9 is a schematic illustration of an embodiment of an alternative easy-entry detent or a locking lever with external control and stop contours and a stop which is secured to the backrest and which comprises a sliding roller.

FIG. 9 is a schematic illustration of an embodiment of an alternative easy-entry detent 5" or a locking lever with an outer contour 5.1" as a control and stop contour. The stop 7' which is secured to the backrest comprises in this embodiment a sliding roller 7.3 which is rotatably arranged on the stop 7' and which slides along the outer contour 5.1" of the easy-entry detent 5" in order to actuate it. The sliding roller 7.3 protrudes in this instance perpendicularly from the seat backrest 1.1 and the upper fitting portion 2.1 so that the outer periphery thereof which is directed forward in the folding direction acts as a locking contour 7.1' and the outer periphery which is directed backward in the perpendicular position of the seat backrest 1.1 acts as a comfort locking control contour 7.2' of the stop 7'.

In order to actuate the easy-entry detent 5", as described with reference to the above-mentioned examples, the outer contour 5.1" is provided with a corresponding recess 5.2", locking detent 5.3" and upper and lower control contours 5.4", comfort control contours 5.5".

While specific embodiments of the invention have been shown and described in detail to illustrate the application of the principles of the invention, it will be understood that the invention may be embodied otherwise without departing from such principles.

The invention claimed is:

1. A fitting having a forward pivoting mechanism, for positioning a seat backrest of a vehicle seat in at least one front position, a comfort locking mechanism for positioning the seat backrest in a comfort region in at least one of seat positions and an expanded comfort function for positioning the seat backrest beyond the front position into a loading floor position, the fitting comprising:
    at least one fitting portion;
    a carrier;
    an easy-entry detent comprising a generally arcuate, elongate element pivotally supported on a seat cushion of the vehicle seat, the arcuate, elongated element having a head at one distal end and a tail at another distal end, the head forming a locking detent that protrudes upwardly at the one distal end relative to an adjacent recess that is spaced from the one distal end, a control contour protruding upwardly relative to the recess toward an end opposite the one end relative to the recess, a pivotal connection of the arcuate, elongate element positioned toward the other end relative to the control contour, and the tail protruding downward at the other distal end;
    a stop secured to the backrest, wherein a pivot region of the seat backrest in the front position is limited by the easy-entry detent engaging in the at least one fitting portion, wherein the easy-entry detent is formed in such a manner that, when the seat backrest is adjusted in the comfort region between the seat positions, the easy-entry detent is in abutment with the stop and, in the front position, the seat backrest is prevented from pivoting further forward by the stop and, when the seat backrest is raised from the front position into one of the seat positions, the seat backrest is pivoted in a controlled manner by engagement of the control contour of the easy-entry detent with the stop.

2. The fitting as claimed in claim 1, wherein the forward pivoting mechanism is formed as at least one of an easy-entry system and a loading system.

3. The fitting as claimed in claim 1, wherein the front position is formed as at least one of an easy-entry position and a loading position.

4. The fitting as claimed in claim 1, further comprising an unlocking lever, wherein the carrier can be coupled to the unlocking lever for unlocking the fitting and can be decoupled from the unlocking lever for positioning the seat backrest from the front position into the loading floor position, wherein, in a decoupled state of the carrier and the unlocking lever, the carrier carries the easy-entry detent when the unlocking lever is actuated.

5. The fitting as claimed in claim 1, wherein the easy-entry detent is locked in a pretensioned manner in the at least one seat position.

6. The fitting as claimed in claim 1, further comprising a resilient element, wherein the easy-entry detent is pretensioned in the at least one seat position by the resilient element.

7. The fitting as claimed in claim 1, wherein the easy-entry detent has at least one outer contour which corresponds to the stop on the fitting portion which is secured to the backrest.

8. The fitting as claimed in claim 1, wherein the easy-entry detent has at least one recess in which the stop slides in the front position of the seat backrest.

9. The fitting as claimed in claim 1, wherein the easy-entry detent has at least one locking detent.

10. The fitting as claimed in claim 1, wherein the easy-entry detent has at least one control contour and one comfort control contour, wherein the control contour is provided to control backward pivoting.

11. The fitting as claimed in claim 4, wherein the unlocking lever has at least one outer comfort control contour which, when the unlocking lever is actuated, is positioned against the easy-entry detent and carries the easy-entry detent.

12. The fitting as claimed in claim 1, wherein the easy-entry detent or locking lever, comprises at least one inner and/or outer guiding, locking and/or control contour.

13. A vehicle seat comprising:
    at least one fitting having a forward pivoting mechanism, for positioning a seat backrest of a vehicle seat in at least one front position, a comfort locking mechanism for positioning the seat backrest in a comfort region in at least one of seat positions and an expanded comfort function for positioning the seat backrest beyond the front position into a loading floor position, the fitting comprising:
    at least one fitting portion;
    a carrier;
    an easy-entry detent comprising a generally arcuate, elongate element pivotally supported on a seat cushion of the vehicle seat, the arcuate, elongated element having a head at one distal end and a tail at another distal end, the head forming a locking detent that protrudes upwardly at the one distal end relative to an adjacent recess that is spaced from the one distal end, a control contour protruding upwardly relative to the recess toward an end opposite the one end relative to the recess, a pivotal connection of the arcuate, elongate element positioned toward the other end relative to the control contour, and the tail protruding downward at the other distal end;
    a stop secured to the backrest, wherein a pivot region of the seat backrest in the front position is limited by the easy-entry detent engaging in the at least one fitting portion, wherein the easy-entry detent is formed in such a manner that, when the seat backrest is adjusted in the comfort region between the seat positions, the easy-entry detent is in abutment with the stop and, in the front position, the seat backrest is prevented from pivoting further forward by the stop and, when the seat backrest is raised from the front position into one of the seat positions, the seat backrest is pivoted in a controlled manner by engagement of the control contour of the easy-entry detent with the stop.

14. The fitting as claimed in claim 13, wherein the fitting further comprises an unlocking lever, wherein the carrier is coupled to the unlocking lever for unlocking the fitting.

15. The fitting as claimed in claim 13, further comprising a resilient element, wherein the easy-entry detent is pretensioned in the at least one seat position by the resilient element.

16. The fitting as claimed in claim 13, wherein the easy-entry detent has at least one outer contour which corresponds to the stop on the fitting portion which is secured to the backrest.

17. The fitting as claimed in claim 13, wherein:
the easy-entry detent has at least one recess in which the stop slides in the front position of the seat backrest; and
the easy-entry detent has at least one locking detent.

18. The fitting as claimed in claim 13, wherein
the easy-entry detent has at least one control contour and one comfort control contour; and
the control contour is provided to control backward pivoting.

19. The fitting as claimed in claim 14, wherein the unlocking lever has at least one outer comfort control contour which, when the unlocking lever is actuated, is positioned against the easy-entry detent and carries the easy-entry detent.

20. An easy-entry detent for a fitting having a forward pivoting mechanism, for positioning a seat backrest of a vehicle seat in at least one front position, a comfort locking mechanism for positioning the seat backrest in a comfort region in at least one of seat positions and an expanded comfort function for positioning the seat backrest beyond the front position into a loading floor position, wherein a pivot region of the seat backrest in the front position is limited by the easy-entry detent engaging in the at least one fitting portion, wherein the easy-entry detent comprises a generally arcuate, elongate element pivotally supported on a seat cushion of the vehicle seat, the arcuate, elongated element having a head at one distal end and a tail at another distal end, the head forming a locking detent that protrudes upwardly at the one distal end relative to an adjacent recess that is spaced from the one distal end, a control contour protruding upwardly relative to the recess toward an end opposite the one end relative to the recess, a pivotal connection of the arcuate, elongate element positioned toward the other end relative to the control contour, and the tail protruding downward at the other distal end, and the easy-entry detent is formed in such a manner that, when the seat backrest is adjusted in the comfort region between the seat positions, the easy-entry detent is in abutment with a stop and, in the front position, the seat backrest is prevented from pivoting further forward by the stop and, when the seat backrest is raised from the front position into one of the seat positions, the seat backrest is pivoted in a controlled manner by engagement of the control contour of the easy-entry detent with the stop and the fitting comprises at least one inner or outer guiding, locking or control contour.

* * * * *